UNITED STATES PATENT OFFICE 2,628,964

PREPARATION OF NAPHTHOSTYRILS

Mario Scalera, Somerville, William B. Hardy, Bound Brook, and Julian J. Leavitt, Somerville, N. J., assignors to American Cyanamid Company, New York, N. Y., a corporation of Maine No Drawing. Application April 7, 1951, Serial No. 219,896

20 Claims. (Cl. 260—326.5)

This invention relates to an improved method of producing substituted and unsubstituted naphthostyrils.

Naphthostyrils, which are important intermediates in the preparation of vat dyestuffs, such as those of the anthanthrone series, have hitherto been prepared only by circuitous processes, the simplest of which involves diazotizing 1-amino naphthalene-8-sulfonic acid, transforming it into the corresponding nitrile, and alkali fusion. Yields have been poor, and the prior processes could not be used in the preparation of many substituted naphthostyrils because of the unavailability of the corresponding amino naphthalene sulfonic acids.

The present invention depends on a new process starting from alpha-naphthyl isocyanates and alpha-naphthyl isothiocyanates. These compounds are isomerized to form naphthostyrils or their sulfur analogs by heating with a Friedel-Crafts catalyst. The process may be illustrated by the production of unsubstituted naphthostyril from alpha-naphthyl isocyanate, which may be represented by the following equation:

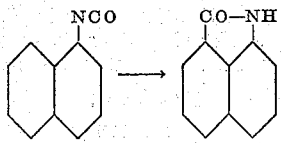

When the alpha-naphthyl isothiocyanate is used, the first step of the process probably involves the formation of the sulfur analog of the naphthostyril, in which oxygen is replaced by sulfur; this sulfur compound is apparently transformed into the corresponding naphthostyril by the treatment with aqueous alkali and acidification. It is not necessary to isolate any intermediate compound in the pure state as the second step may be carried out in the same reaction vessel. In any event, the same high purity naphthostyrils are obtained from alpha-naphthyl isothiocyanates as are obtained from alpha-naphthyl isocyanates.

The process is applicable not only to the production of unsubstituted naphthostyril, but also to substituted naphthostyrils in which the peri position carries a reactive hydrogen. Examples of such substituents are the halogens, such as chlorine, bromine, nitro groups, hydroxy groups, alkoxy groups and the like.

It is an advantage of the present invention that the general procedure of the Friedel-Crafts reactions can be followed. Thus the typical catalysts may be used, such as aluminum chloride, aluminum bromide, boron trifluoride, zirconium chloride, and the like. Because of its cheapness, ready availability and good performance, aluminum chloride is the preferred catalyst.

We have found that dilution is an advantage because when the concentration of isocyanates in the reaction mixture becomes too high, as when no diluent is used, there is a tendency to intermolecular reactions which result in producing undesired by-products.

The choice of the diluent again can follow Friedel-Crafts practice, and the common anhydrous diluents used in such reactions are also applicable here. These include solids such as sodium chloride and the like; inert organic liquids either of the negatively substituted aromatic class, for example chlorobenzene, orthodichlorobenzene and the like, or of the aliphatic class such as nitromethane, acetylene, tetrachloride, carbon disulfide, high boiling paraffins, and the like.

The nature of the diluent to be employed is affected in some cases by the temperature at which the reaction is carried out. This temperature is not critical, but fairly elevated temperatures give higher yields and better products. Without limiting the invention to particular temperatures, we prefer a temperature range between about 100° and 200° C. When the higher temperatures of the preferred range are used, the diluent is preferably one that has a substantially elevated boiling point, and this excludes, for most operations, a number of low-boiling diluents, such as carbon tetrachloride or carbon disulfide, which might otherwise present economic advantages. It is, of course, possible to operate under pressure, and such processes are included in the broader aspects of the present invention. However, the increased cost and problems presented by the use of autoclaves render procedures under atmospheric pressures distinctly preferable. Inasmuch as there are available many inert diluent liquids which have substantially high boiling points, we prefer to operate under atmospheric pressure.

The alpha-naphthyl isocyanates are normally prepared by the reaction of the corresponding alpha-naphthylamines with phosgene. It is possible to use isolated pure isocyanate, but it is not necessary for we have found that the reaction mixture of the alpha-naphthylamines and phosgene can be used for the isomerization step when excess phosgene has been removed. It is not necessary to isolate the alpha-naphthyl isocyanate from the reaction mixture, and such mixtures are therefore included in the invention. The exact constitution of the reaction mixture of phosgene with alpha-naphthylamines will vary and has not been completely determined. It is not a pure dispersion of isocyanate; impurities are present which, however, appear to have no adverse effect on the isomerization step. One impurity, the corresponding carbamyl chloride, which is probably present in the reaction mixture, is also cyclized, possibly by first forming isocyanate. In any case, a considerable portion of any carbamyl chloride present appears to be effectively utilized.

The use of impure reaction mixtures of phosgene and alpha-naphthylamine described above lends itself advantageously to a combined process, in which the reaction with phosgene and the second step of isomerization are carried out in the same reaction medium. It is an advantage that the same diluent may be used for both steps in this modification. However, it is not necessary that the concentrations should be the same. Thus it is possible to carry out the first step in somewhat more concentrated reaction medium and obtain the desired more dilute medium for the isomerization step by the addition of additional diluent.

The invention will be described in greater detail in conjunction with the folowing examples. Parts are by weight.

*Example 1*

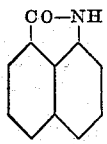

A solution of 8.5 parts of alpha-naphthyl isocyanate in 52 parts of orthodichlorobenzene is gradually added to a slurry of 16 parts of aluminum chloride in 130 parts of o-dichlorobenzene held at 160°. The mixture is poured into dilute hydrochloric acid and the solvent removed by steam distillation. The residual aqueous slurry is filtered and the cake extracted with 330 parts of 2.5-N sodium hydroxide at 85-90°. The yellowish extract is acidified with hydrochloric acid and heated to 90°. The precipitate of naphthostyril is filtered at 20° and dried to give an excellent yield of product of high purity.

*Example 2*

A solution of 8.5 parts of alpha-naphthyl isocyanate in 52 parts of trichlorobenzene is gradually added to a slurry of 8.0 parts of aluminum chloride in 130 parts of trichlorobenzene maintained at 175°. The reaction mixture is worked up as described in Example 1 to give naphthostyril in good yield and purity.

The same product is obtained by adding 16.9 parts of alpha-naphthyl isocyanate with stirring to a mixture of 27 parts of sodium chloride and 54.0 parts of aluminum chloride at 150°. The reaction is completed at 180–190° and the mixture drowned in water. The product is filtered and washed. It can be purified by crystallization from toluene.

*Example 3*

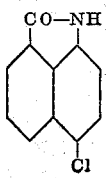

4 parts of 1-amino-4-chloronaphthalene are dissolved in 52 parts of dichlorobenzene and the solution saturated with dry hydrogen chloride. Phosgene is then passed into the slurry at 150° until a clear solution results. The excess phosgene is removed under reduced pressure and the residual solution gradually added to a slurry of 6 parts of aluminum chloride in 65 parts of dichlorobenzene held at 160°. The reaction mixture is worked up as in Example 1. 4-chloronaphthostyril is obtained in good yield.

*Example 4*

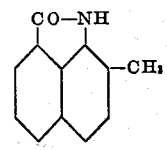

13 parts of 1-amino-2-methylnaphthalene hydrochloride in 169 parts of o-dichlorobenzene is treated with phosgene at 170° to give a clear solution. The mixture is then concentrated under reduced pressure to remove excess phosgene. The residue is gradually added to a slurry of 19.4 parts aluminum chloride in 208 parts of dichlorobenzene held at 160°. The mixture is worked up in the usual way to give 2-methyl-naphthostyril, a greenish yellow solid, M. P. 214 (uncorrected).

*Example 5*

A solution of 8.5 parts of alpha-naphthyl isocyanate in 52 parts of dichlorobenzene is added gradually to a slurry of 8.0 parts of aluminum chloride in 130 parts of dichlorobenzene held at 130°. The reaction mixture is worked up in the usual manner to give essentially pure naphthostyril.

*Example 6*

35 parts of zirconium tetrachloride are stirred in 130 parts of o-dichlorobenzene. To the rapidly stirred slurry held at 175° are added 8.5 parts of alpha-naphthyl isocyanate in 52 parts dichlorobenzene. Naphthostyril is isolated from the reaction mixture in the usual manner.

*Example 7*

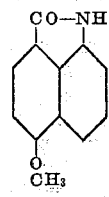

2.3 parts of 1-amino-5-methoxynaphthalene hydrochloride in 32 parts of o-dichlorobenzene are treated with phosgene at 130° to give a clear solution. The excess phosgene and some dichlorobenzene are removed under reduced pressure. The residue is added gradually to 20 parts of zirconium tetrachloride in 52 parts of dichlorobenzene held at 140°. After steaming out the dichlorobenzene the residue is extracted with 2.5 molar sodium hydroxide and the crude product precipitated with acid and heated to form the lactam. The dried solid is extracted with hot toluene, which deposits brown yellow crystals of 5-methoxy naphthostyril.

*Example 8*

A mixture of 4 parts of aluminum chloride and 65 parts of o-dichlorobenzene is heated to 100° C. and 1.6 parts of alpha-naphthyl isothiocyanate are gradually added. After the addition is completed, the mixture is stirred at the same temperature until the reaction has ceased. The reaction mixture is then drowned in 25 parts of 5-N hydrochloric acid and the dichlorobenzene is removed by steam distillation. The mixture is chilled and filtered. The product is dissolved in sodium hydroxide solution containing some alcohol, and clarified. The solution is heated for a long period, then acidified with hydrochloric acid. The precipitated product is cooled and filtered.

A good yield of naphthostyril is obtained which, if desired in still greater purity, may be further purified by solution in hot caustic soda and acidification.

This application is in part a continuation of our copending application, Serial No. 163,324, filed May 20, 1950, now abandoned.

We claim:

1. A process of producing a naphthostyril which comprises heating a compound selected from the group consisting of alpha-naphthyl isocyanates and alpha-naphthyl isothiocyanates unsubstituted in the peri position with a Friedel-Crafts catalyst under normal Friedel-Crafts reaction proportion conditions in a reaction mixture containing a sufficient inert diluent to repress intermolecular reactions the temperature being maintained at a point sufficient low so that under the pressure conditions prevailing a major portion of the diluent is in the liquid phase and continuing the heating until cyclization to the naphthostyril is substantially complete.

2. A process of producing a naphthostyril which comprises heating of an alpha-naphthyl isocyanate unsubstituted in the peri position with a Friedel-Crafts catalyst under normal Friedel-Crafts reaction proportion conditions in a reaction mixture containing a sufficient inert diluent to repress intermolecular reactions the temperature being maintained at a point sufficiently low so that under the pressure conditions prevailing a major portion of the diluent is in the liquid phase and continuing the heating until cyclization to the naphthostyril is substantially complete.

3. A process of producing naphthostyril which comprises heating alpha-naphthyl isocyanate with a Friedel-Crafts catalyst under ordinary Friedel-Crafts reaction proportions and in a reaction mixture comprising a major amount of an inert diluent and a minor amount of alpha-naphthyl isocyanate the temperature being maintained at a sufficiently low point so that under the pressure conditions prevailing in the reaction a major portion of the diluent is in the liquid phase, the reaction being continued until cyclization is substantially complete.

4. A process of producing a naphthostyril which comprises reacting an alpha-naphthylamine having a free peri position with phosgene, removing the phosgene and heating the product with a Friedel-Crafts catalyst under ordinary Friedel-Crafts reaction proportions in a reaction medium sufficiently dilute to repress intermolecular reactions until cyclization is substantially complete, the temperature being maintained at a point sufficiently low so that the major portion of the reaction mixture is unvaporized.

5. A process according to claim 4 in which the alpha-naphthylamine is alkoxy substituted.

6. A process of cyclizing an alpha-naphthyl isothiocyanate having a free peri position which comprises heating it with a Friedel-Crafts catalyst under normal Friedel-Crafts reaction proportions in a reaction medium sufficiently dilute to repress intermolecular reactions, the heating being continued until cyclization is substantially complete and the temperature being maintained sufficiently low so that the major portion of the reaction medium remains unvaporized.

7. A process according to claim 2 in which the reaction is effected in a reaction medium comprising a major amount of inert diluent and a minor amount of alpha-naphthyl isocyanate.

8. A process according to claim 7 in which the diluent is an anhydrous inert organic liquid.

9. A process according to claim 8 in which the temperature range is approximately 100 to 200° C.

10. A process according to claim 9 in which the Friedel-Crafts catalyst is aluminum chloride.

11. A process according to claim 10 in which the organic diluent is o-dichlorobenzene.

12. A process according to claim 3 in which the Friedel-Crafts catalyst is aluminum chloride.

13. A process according to claim 12 in which the diluent is an anhydrous inert organic liquid.

14. A process according to claim 13 in which the temperature range is approximately 100 to 200° C.

15. A process according to claim 14 in which the organic liquid is o-dichlorobenzene.

16. A process according to claim 4 in which the catalyst is aluminum chloride.

17. A process according to claim 16 in which the alpha-naphthylamine is unsubstituted alpha-naphthylamine.

18. A process according to claim 3 in which the alpha-naphthyl isocyanate is an alkoxy.

19. A process according to claim 18 in which the Friedel-Crafts catalyst is aluminum chloride.

20. A process according to claim 5 in which the Friedel-Crafts catalyst is aluminum chloride.

MARIO SCALERA.
WILLIAM B. HARDY.
JULIAN J. LEAVITT.

No references cited.